US007349635B2

(12) United States Patent
Chuah et al.

(10) Patent No.: US 7,349,635 B2
(45) Date of Patent: Mar. 25, 2008

(54) METHOD AND APPARATUS FOR ROUTING MESSAGES IN HYBRIDIZED OPTICAL/WIRELESS NETWORKS

(75) Inventors: Mooi Choo Chuah, Marlboro, NJ (US); Randy C. Giles, Whippany, NJ (US); Xiang Liu, Marlboro, NJ (US); Muhammad A. Qureshi, Green Brook, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 715 days.

(21) Appl. No.: 10/725,342

(22) Filed: Dec. 1, 2003

(65) Prior Publication Data

US 2005/0117914 A1    Jun. 2, 2005

(51) Int. Cl.
*H04B 10/00* (2006.01)
*H04B 10/04* (2006.01)

(52) U.S. Cl. ............... 398/163; 398/115; 398/116; 398/182

(58) Field of Classification Search ............... 398/118, 398/130, 115, 116, 140, 182, 163, 141, 154, 398/183

See application file for complete search history.

(56) References Cited

U.S. PATENT DOCUMENTS

| 6,118,566 | A * | 9/2000 | Price | 398/194 |
| 6,580,532 | B1 * | 6/2003 | Yao et al. | 398/39 |
| 6,775,482 | B1 * | 8/2004 | Shimomura et al. | 398/183 |

OTHER PUBLICATIONS

D. Awduche, etc. "RSVP-TE: Extensions to RSVP for LSP tunnels", RFC3209, Dec. 2001.

M. Bicerstaff, et al., A 24Mb/ Radix-4 LogMAP Turbo Decoder for 3GPP-HSDPA Mobile Wireless, IEEE International Solid-State Circuits Conference, 2003.

M. Chan, et al., "TCP/IP Performance over 3G Wireless Links with Rate and Delay Variation", Proceedings of Mobicom, 2002, Sep. 23-28, 2002.

J. Chen, et al., "Measured Performance of 5-GHz 802.11a Wireless Lan Systems", Atheros White Paper, Aug. 27, 2001.

C. Eklund et al. , "IEEE Standard 802.16: A Technical Overview of the WirelessMAN Air Interface for Broadband Wireless Access", IEEE Communication Magazine, Jun. 2002.

P. Jacquet et al., "Optimized Link-State Protocol", Oct. 2003.

(Continued)

*Primary Examiner*—M. R. Sedighian

(57) ABSTRACT

Method and apparatus for routing messages in a network includes first filters to provide frequency-based message signals converted from an optically-based signal and mixers adapted to mix the frequency-based message signals with sub-carriers to generate frequency-based sub-carrier modulated message signals. A frequency generator connected to the mixers provides the sub-carriers to the mixers and a combiner connected to the mixers combines the frequency-based sub-carrier modulated message signals. Second filters connected to the combiner receive and group the frequency-based sub-carrier modulated message signals. Optical transmitters connected to second filters optically convert and transmit the frequency-based sub-carrier modulated message signals. The frequency generator generates and applies a particular sub-carrier frequency to one of the mixers according to information contained in the frequency-based message signal. The information is encoded into the frequency-based message signal via a generalized MPLS (GM-PLS) label contained in a header portion of the frequency-based message signal.

12 Claims, 4 Drawing Sheets

OTHER PUBLICATIONS

B. Jamoussi et al., "Constraint-based LSP Setup using LDP", RFC3212, Jan. 2002.

D. B. Johnson, et al., "Dynamic Source Routing in Adhoc Wireless Networks", Mobile Computing, Kluwer Academic Publishers, 1996.

D. Katabi et al., "Congestion Control for High Bandwidth-Delay Networks", Proceedings of Mobicom 2002, Aug. 19-23, 2002.

Xu C., et al., Comparison of Return-to-Zero Differential Phase-shift Keying and On-Off Keying in Long-Haul Dispersion Managed Transmission, IEEE Photonics Technology, letters, vol. 15, No. 4, Apr. 2003.

J. Moy, OSPF Version 2, RFC 1583, Mar. 1994.

C. Perkins, "Adhoc On Demand Distance Vector Routing", RFC 3561, Jul. 2003.

ERCEG etc. "Channel Models for Fixed Wireless Applications", IEEE 802.16 contribution, Jan. 22, 2001.

G. Pei, et al., "LANMAR; Landmark Routing for Large Scale Wireless Adhoc Networks with Group Mobility", Proceedings of MobiHoc 2000, Boston, MA., Aug. 2000.

R. Stewart etc., Stream Control Transmission Protocol (SCTP), RFC 2960, Oct. 2000.

* cited by examiner

METHOD AND APPARATUS FOR ROUTING MESSAGES IN HYBRIDIZED OPTICAL/WIRELESS NETWORKS

FIELD OF INVENTION

The present invention relates to wireless networks. More specifically, the present invention relates to the routing of messages in a wireless network without the need for manipulation of information at the packet level upon which the wireless network is based.

BACKGROUND OF INVENTION

Sustained connectivity between nodes of a wireless network is an important feature of the network because it assures quality and reliability of the service that the network is providing to its users. Currently existing wireless networks depend on two types of technology to establish links between nodes; radio frequency (RF) and optical. Nodes are constructed with components identified as routers that perform the actual passing of information in to and out of the node. The routers are either one type of technology or the other or, more likely, one of each type in order to take advantage of each technology's strong points. For example, RF performs adequately in most conditions except for rain while optical technology performs adequately except for fog. Additionally, RF technology typically has a lower bandwidth than optical (11 Mbps vs. 155 Mbps), but RF does not suffer from the same limited line-of-site characteristics as optical technology.

Regardless of the technology used, bearer traffic (the actual messages moving through the network as information packets) needs to be forwarded from one node to another in an efficient manner. Both RF and optically-based systems use various modulation and coding techniques to transmit the bearer traffic from one node to another. However, at each node, the specific type of link (either RF or optical) is terminated, Internet Protocol (IP) control and signaling messages attached to the messages must be extracted therefrom, repackaged into formats that can be transported to the next node and finally retransmitted. This process traverses multiple protocol layers as each message is essentially "torn down" and rebuilt at each intermediate node resulting in processing delays and increased delivery time of the message. As such, there is a need in the art for improving the reliability of node performance while reducing the necessary amount of processing steps at the intermediate nodes to complete message delivery.

SUMMARY OF THE INVENTION

The disadvantages heretofore associated with the prior art are overcome by a novel apparatus and method for routing messages in wireless networks. The apparatus includes a first plurality of filters adapted to provide a plurality of frequency-based message signals converted from an optically-based signal, a plurality of mixers connected to the first plurality of filters and adapted to mix the plurality of frequency-based message signals with a plurality of sub-carriers to generate a plurality of frequency-based sub-carrier modulated message signals, a frequency generator connected to the plurality of mixers for providing the plurality of sub-carriers to the mixers, a combiner connected to the mixers for combining the plurality of frequency-based sub-carrier modulated message signals, a second plurality of filters connected to the combiner and adapted to receive and group the plurality of frequency-based sub-carrier modulated message signals, a plurality of optical transmitters connected to one of the second plurality of filters for optically converting and transmitting the frequency-based sub-carrier modulated message signals.

The first plurality of filters is preferably RF filters centered at a pre-defined sub-carrier frequencies for recovering baseband frequencies (containing original messages). The frequency generator generates and applies a particular sub-carrier frequency to one of the mixers according to control information appended to the frequency-based message signal. The information is appended to the frequency-based message signal via generalized MPLS (GMPLS) labeling contained in a header portion of the frequency-based message signal. Additionally, the second plurality of filters are bandpass filters.

A method for routing messages in wireless networks includes the steps of optically receiving one or more composite optical signals, converting said one or more composite optical signals into a plurality of frequency-based message signals, mixing one or more of the plurality of frequency-based message signals with a corresponding sub-carrier to generate one or more sub-carrier modulated frequency-based signals, combining and grouping said one or more sub-carrier modulated frequency-based signals and optically converting and transmitting each group of said one or more sub-carrier modulated frequency-based signals. The converting step includes filtering the received signals at predetermined sub-carrier frequencies to recover the frequency-based message signals contained therein. The step of mixing includes interpreting control information associated with the frequency-based message signal to determine the appropriate sub-carrier for mixing. The control information is sent using a generalized MPLS protocol.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
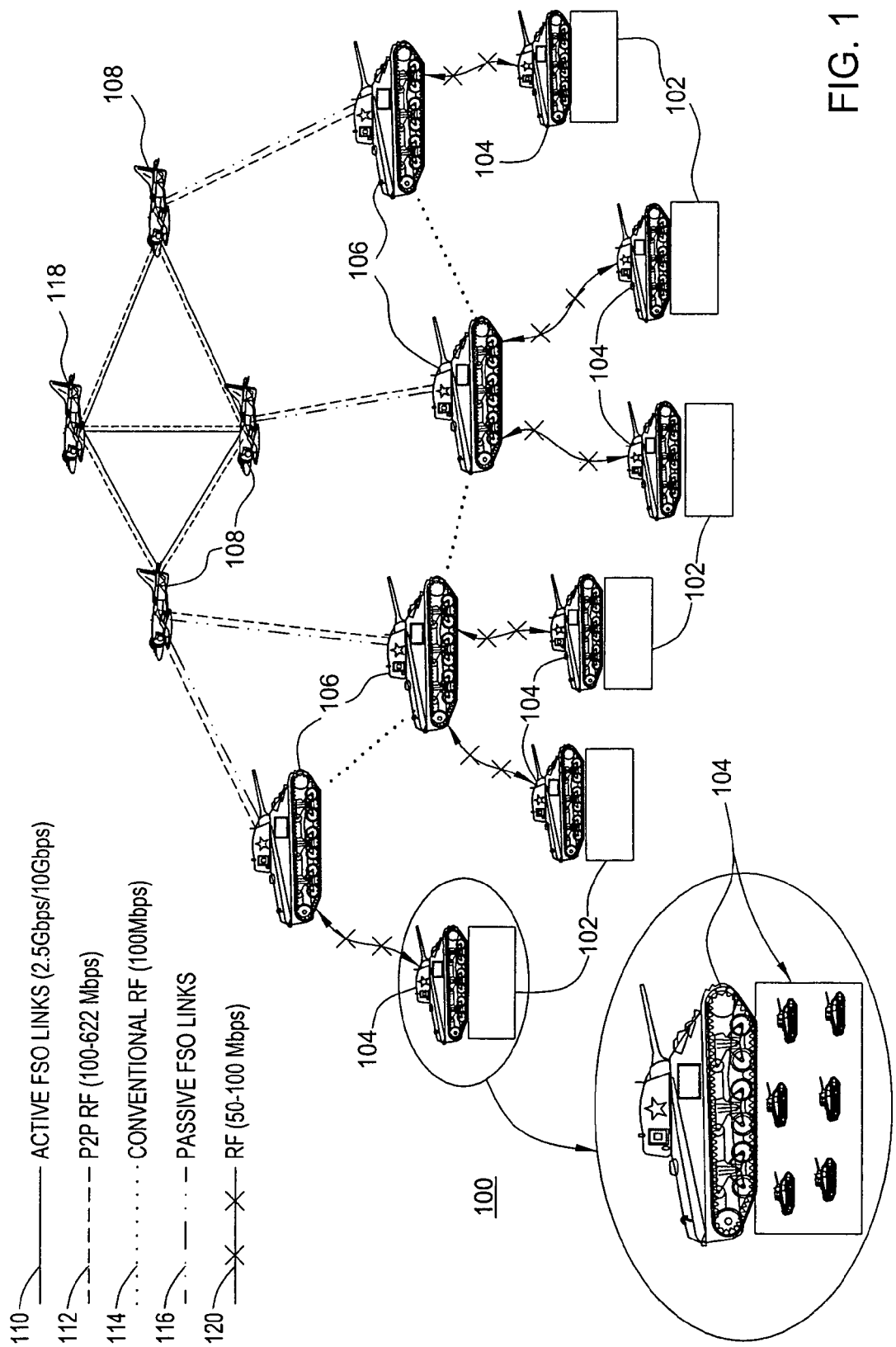
FIG. 1 depicts a high level organizational diagram of the hybrid optical/wireless network of the subject invention.

FIG. 1 depicts a high level organizational diagram of the hybrid optical/wireless network of the subject invention. Specifically, a hybrid optical/wireless network 100 is shown as a plurality of nodes having various hierarchies and information handling capabilities interconnected by a plurality of communication links. The nodes are presented in order of their hierarchy starting with the lowest relative hierarchy elements. The lowest level nodes are mini-networks 102 which are comprised of one or more network users 104. For example in one embodiment, the mini-networks 102 are comprised of one or more ground-based ground agents 104 that receive information and execute orders based on information from elsewhere in the hierarchy. Each of the network users 104 in the mini-networks 102 can communicate with one another based on RF transceivers. In one embodiment, such RF transceivers are based on IEEE 802.11 based radio standards.

For each mini-network 102 there is a mini-network head 106 that represents the second level of the hierarchy in the network 100. In one embodiment, mini-network heads 106 are tanks providing support to ground agents 104. Such mini-network heads 106 have three types of transceivers. In one embodiment of the invention, these three types of receivers include one set of radio-based transceivers (802.11 based radios) that allow the mini-network heads 106 to communicate with ground agents 104 of the mini-network 102. The second set of radio based transceivers (based on IEEE 802.16 radio standards) operate at a higher relative power level than the first set of radio-based transceivers for communication with upper level hierarchy nodes in the system 100. A communication range of the 802.11-based radios is on the order of a few hundred feet and a bandwidth of approximately 54 Mbps. A communication range of an 802.16-based radio is on the order of a few kilometers with a maximum possible bandwidth of approximately 70 Mbps.

One or more airborne nodes 108 comprise the third level of hierarchy in the network 100. In one example, airborne nodes 108 are low altitude unmanned airborne vehicles (e.g., unmanned surveillance planes). A fourth level of hierarchy in the network 100 is a second type of airborne node 118. In one embodiment, a second type of airborne node 118 is a plane or satellite communicating with first airborne nodes 108.

Each of the first order airborne nodes 108 and second order airborne nodes 118 effectively create another layer of network to allow high bandwidth communication between users 104 of the various mini-networks 102. First order airborne nodes 108 and second order airborne nodes 118 communicate amongst each other with a dual mode communication link. Specifically, a first branch of the dual communication link is for example, an 802.16-based RF link and the second branch of the dual communication link is a Free Space Optical (FSO) link. The FSO link provides an alternate high-bandwidth communication link between first order airborne nodes 108 and second order airborne node 118. FSO transceivers are located in each airborne node 108 and 118 as well as in each mini-network head 106. That is, ground based mini-network heads 106 are able to communicate with first order airborne nodes 108 via an FSO link or in the alternative via an RF link (802.16-based radio). For ease of viewing FIG. 1, each of the identified communication links have been labeled in the key portion of FIG. 1. Specifically, FSO links between first order airborne nodes 108 and second order airborne node 118 is communication link 110. High bandwidth RF (802.16) links 112 also serve between first order airborne nodes 108 and second order airborne node 118 as well as serving as a communication link between first order airborne nodes 108 and mini-node head elements 106. Additionally, as an alternative high bandwidth communication link, FSO links 116 exist between mini-node head elements 106 and first order airborne nodes 108. Conventional RF communication links 114 exists between mini-network head elements 106 as well as between network users (ground agents) 104 of the mini-networks 102. RF links from ground agents 104 of the mini-network 102 to the mini-network heads 106 are represented by links 120.

Figure 2:
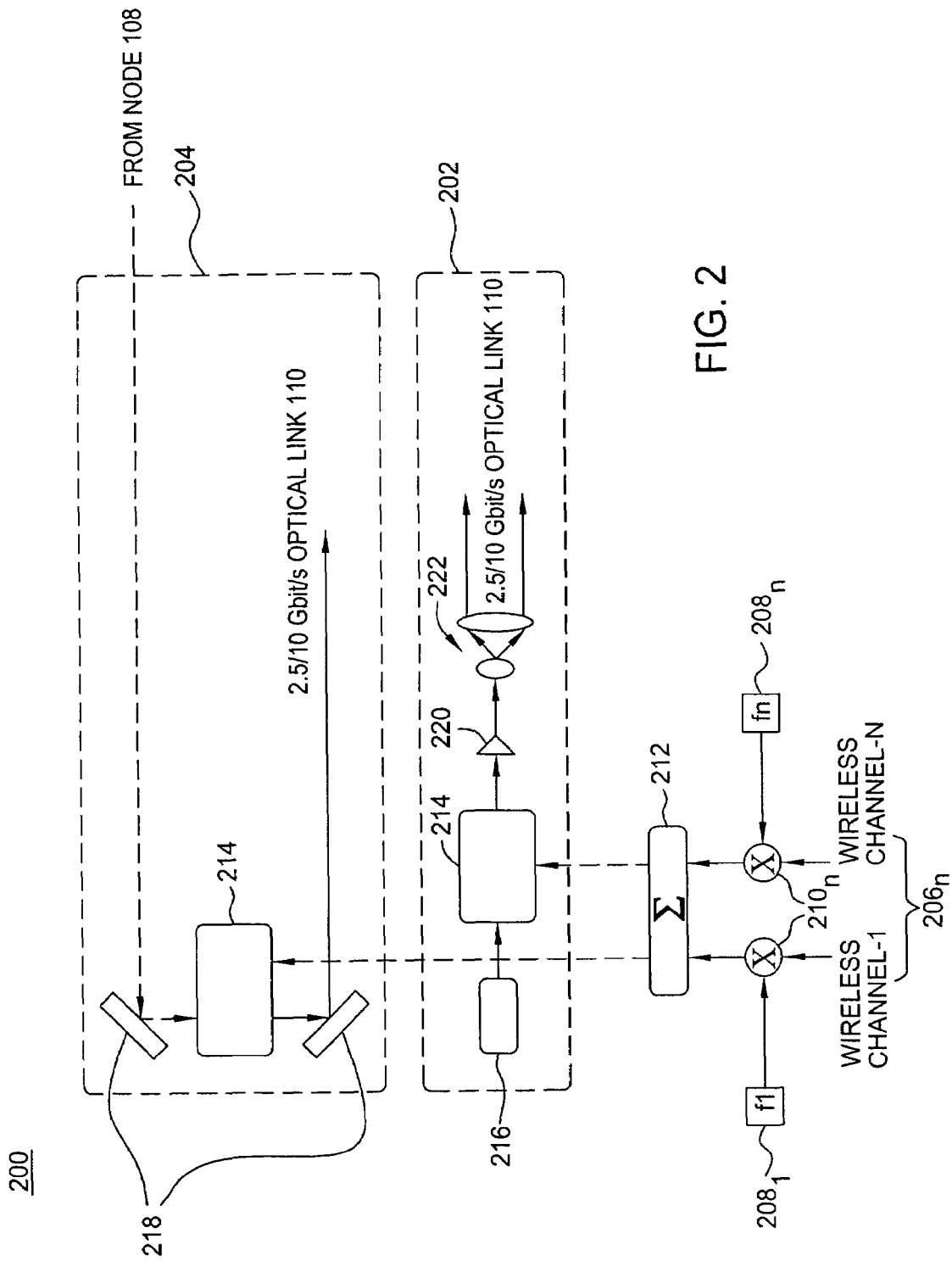
FIG. 2 depicts a block diagram of a Free Space Optical (FSO) transmitter in accordance with the subject invention.

FIG. 2 depicts a FSO transmitter 200 in accordance with the subject invention. The transmitter 200 in one embodiment is outfitted in second order hierarchy nodes 106 (e.g., the mini-network head nodes). Each FSO transmitter 200 contains a primary transmitter 202 and is optionally equipped with a secondary transmitter 204. Regardless of which transmitter is used, the resulting output of the transmitter is an optical signal (such as 2.5/10 Gbps optical link 110) from a series of wireless channels. More specifically, wireless information obtained from ground agents or network users 104 of the mini-network 102 are first processed (e.g., multiplexed, packaged and forward-error correction coded) and grouped into several wireless channels 206. For example, in the transmitter 200 shown in FIG. 2, there are N wireless channels each having a capacity of approximately 155 Mbps. Each wireless channel 206 is mixed with an RF sub-carrier via a corresponding RF carrier generator $208_n$ via a corresponding mixer $210_n$. That is, for each wireless channel $206_n$ there is a corresponding frequency generator $208_n$ and mixer $210_n$ so that each wireless channel $206_n$ has its own unique sub-carrier associated therewith. Alternately, a single generator 208 is used having the capability to deliver different sub-carrier frequencies to the mixers 210.

Once the wireless channels $206_n$ are sub-carrier mixed (modulated), all wireless channels are then combined by combiner 212 to create a composite RF signal that is used to drive a transmitter modulator. More specifically, each of the primary transmitter 202 and secondary transmitter 204 are equipped with an optical modulator 214 which is driven by the composite RF signal. However, each of the transmitters 202 and 204 use different sources for generating the optical signal. In the case of the primary transmitter 202, an onboard laser source 216 is used as the optical carrier. The laser source 216 is inputted to the optical modulator 214 as is the composite RF signal from mixer 212 to generate an optically modulated composite signal. The modulated composite optical signal is amplified via amplifier 220 and then passed through a lens arrangement 222 to provide the proper optical characteristics for transmitting via FSO link 110. In the case of the secondary transmitter 204, the laser source is provided from outside the transmitter 204. Specifically, and in one embodiment, the source is provided from for example an aerial node 108. The optical source from node 108 is captured by a series of reflectors 218 in the secondary transmitter 204. The source is then supplied to the optical modulator 214, which, when driven with the composite RF signal from mixer 212 creates the desired modulated composite optical signal to be applied along FSO link 110.

Figure 3:
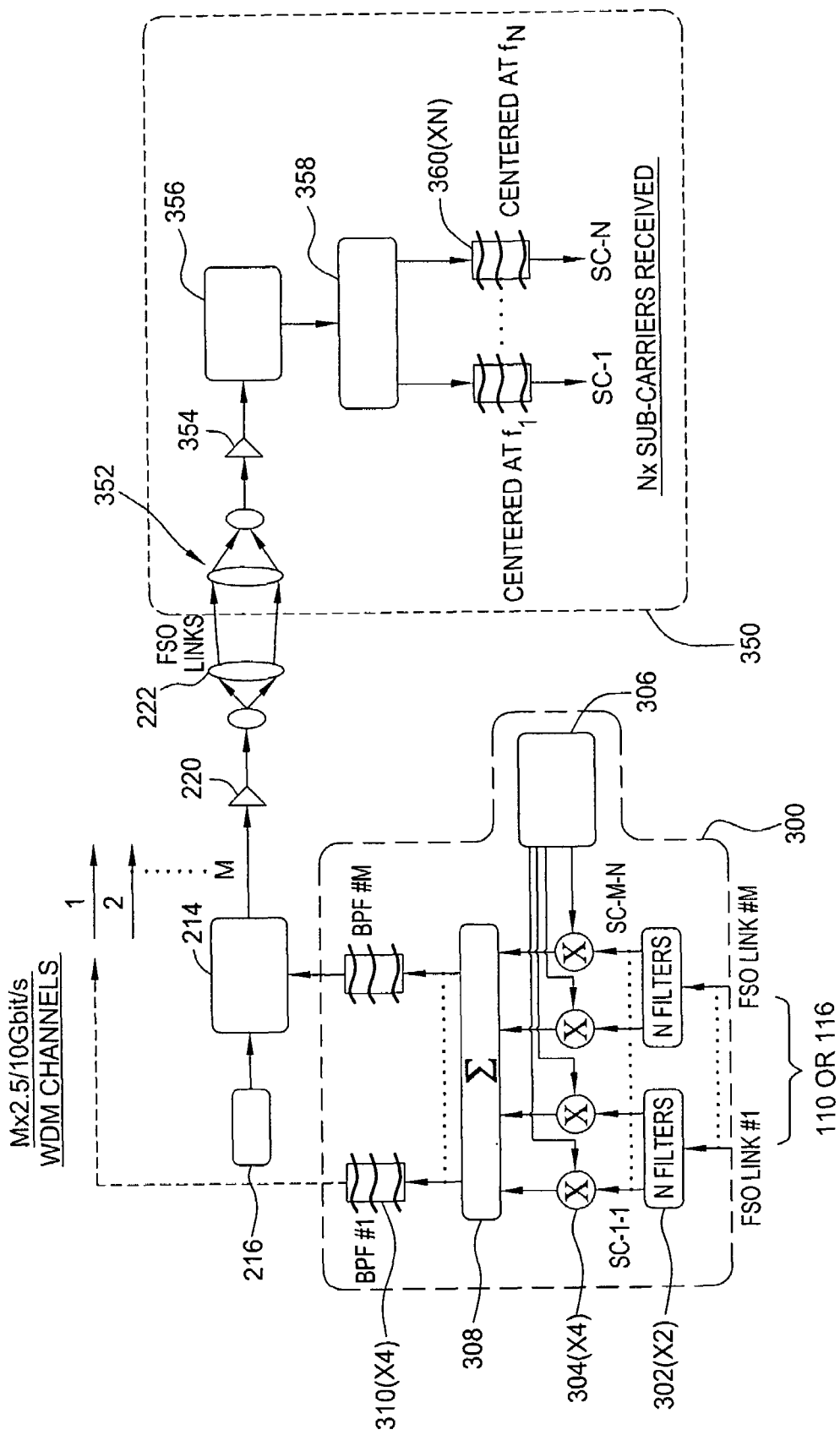
FIG. 3 depicts a block diagram of a hybrid optical/wireless network router and optical receiver in accordance with the subject invention.

FIG. 3 depicts a block diagram of a hybrid optical/wireless network router (HOWNR) 300 and optical receiver 350 in accordance with the subject invention. The HOWNR 300 receives a plurality of high bandwidth information streams (contained within the modulated composite optical signal), processes the information streams in the optical and frequency regimes and forwards the information streams to the next appropriate node in the network 100. As the information streams are not processed according to the various IP protocols (i.e., UDP/TCP/XCP/SCTP/NTP and the like), the messages contained within the information streams are delivered in a much shorter timeframe than currently possible. In other words, routing of messages is conducted by virtue of the sub-carrier manipulation and redirection and not at the packet level. Such optical/frequency regime processing eliminates the need to perform deinterleaving of the IP packets, perform next hop addressing and reinterleave all at the packet level. The optical receiver 350 represents a terminal node of the network 100 for a particular message. The optical receiver 350 contains all necessary components for FSO link reception and filtering to capture the desired modulated sub-carrier RF signal. Subsequently, the sub-carrier modulated RF signal is demodulated and the RF signal is processed and decoded/deinterleaved to retrieve the original message.

Specifically, the HOWNR 300 receives a plurality of FSO-based signals (e.g. from either links 110 or links 116 depending upon the node from which the signals are received) via an optical receiver/detector (not shown). The receiver/detector converts the FSO-based signals into the frequency domain. Subsequently, the frequency domain signals are passed through a plurality of filters 302 to recapture the various basebands (located at sub-carrier frequencies SC 1-1-SC M-N) contained therein. In one embodiment, there are M filters 302 for M FSO links at a particular higher level node (e.g., airborne nodes 108 or airborne node 118) in the network 100. Additionally, each filter 302 has N branches (one for each sub-carrier modulated signal carried on a given FSO link (110/116). The filters 302 are connected to a plurality of mixers 304 for further frequency mixing of the baseband signals. A tunable RF carrier generator 306 is also connected to the mixers 304 for assigning a new sub-carrier frequency to each of the baseband signals (original messages). The reassignment process is conducted based upon instructions received by the tunable RF carrier generator 306 from the network 100 to determine the next hop for a particular message. That is, each message is assigned a sub-carrier that is based on it destination (terminating node) when being processed by a HOWRN 300; the actual message itself is not further processed (i.e., intermediate node IP addressing at the packet level or the like).

A combiner 308 is connected to each mixer 304 for combining and regrouping each of the reassigned sub-carrier modulated signals into M new composite RF signals for FSO modulation along the M links to the next hop. A plurality of filters 310 is connected to the combiner 308 for filtering each of the M composite RF signals. That is, each composite RF signal contains sub-carriers that are relatively close in frequency so that band pass filtering via each of the plurality of filters 310 passes only the sub-carriers of the specific group. A plurality of optical modulators 214, along with their respective sources 216, are connected respectively to the plurality of filters 310. That is, for each of the new M composite RF signals, there is a corresponding optical modulator 214 for modulating said M composite RF signals along M different optical source frequencies (determined by sources 216). The optically remodulated composite signals are amplified via an optical amplifier 220 and then passed through a lens arrangement 222 to provide the proper optical characteristics for transmitting the modulated composite optical signal via an FSO link (e.g., link 110 or 116). While in one embodiment of the invention, the optical modulators 214, sources 216, amplifiers 220 and lens arrangements 222 of the HOWRN 300 have been identified as comparable to those elements found in the transmitter 200, one skilled in the art will realize that these components need not be identical so long as they achieve the desired results.

The optical receiver 350 is the counterpart to the transmitter 200. Accordingly, each node in the network 100 having a transmitter 200 will also have an optical receiver 350 for detecting and receiving messages sent over FSO links (110/116); thereby acting as a terminal node for a particular grouping of messages. The optical receiver 350 includes a lens arrangement 352 for receiving FSO link based optical signals. An amplifier 354 is connected to the lens arrangement 352 to amplify the FSO link based optical signals for ease of recovery and processing. An optical detector 356 is connected to the amplifier 354 to detect the appropriate composite signal of which the node (110/116) is intended to receive. That is, each receiver 356 is tuned to receive only a specific and fixed one of the M different optical source frequencies 216. Thus, only messages multiplexed and modulated according to the specific optical source (e.g., M) 216 are detected by the receiver 356 and converted to the frequency domain. Any other composite signals (i.e., M−1, M+1, etc.) that may be part of that particular FSO link are ignored by the receiver 356. A splitter 358 splits the composite frequency domain signal into N channels. Each of the N channels are defined by filters 360 that recover the baseband frequencies within the composite frequency domain signal. That is, and in one embodiment, N bandpass filters centered at the N sub-carrier frequencies (determined at for example frequency generator 306) are used to recover N baseband frequencies. Each of the N baseband signals are then extracted by digitization and additional signal processing (i.e., forward error correction decoding and deinterleaving) to recover the original messages. Additional processors for performing the extraction and processing are not shown and generally known to those skilled in the art. An example of such processors is found in "A 24 Mb/s Radix-4 LogMAP Turbo Decoder for 3GPP-HSDPA Mobile Wireless" by Bickerstaff et al; 2003 IEEE International Solid-State Circuits Conference, Communications Signal Processing, Paper 8.5 herein incorporated in its entirety by reference.

The selection of the appropriate sub-carrier for the appropriate original message and eventual routing via an FSO link is done via control signal channels associated with a given message. In one embodiment of the invention, IP control signaling protocols (e.g., TCP protocols) are used to establish the desired instructions and sub-carrier assignments. By using an extra label in the IP protocol, each HOWRN 300 assigns or maps a certain wireless channel (having a corresponding sub-carrier frequency assigned thereto) to each message processed by that node. An HOWRN 300 that receives a particular message knows what channel the message is located at by virtue of the control messaging attached thereto. Accordingly, this HOWRN 300 can easily consult its mapping tables to determine the next intermediate node, select a new appropriate channel to assign the message to, create a new control message advising of the new channel assignment, perform the necessary encoding and send the message. In one embodiment of the invention, the control messaging is an extra label identified as a generalized MPLS label (GMPLS) that identifies a particular sub-carrier to the message to which the label is attached. That is, control signal information instructs frequency generator 306 of which sub-carrier to generate at a particular mixer 304 for a particular baseband signal.

By the following description of the various components of the network 100, it can be seen that it is beneficial to switch RF signals (original messages) at intermediate hybrid routers in the manner described. The prior art alternative of terminating each original message, performing demodulation and deinterleaving to extract the IP packet information and then re-interleave and re-modulate the messages does not reveal the advantages of the subject system. Namely, each subcarrier carries an RF channel (original message) that is transmitted and received independently of other RF channels. Only the control messaging in the extra layer is terminated and reassigned at each HOWNRN 300. The original message is "virtually untouched" by the FSO links 110/116 and HOWNR 300; therefore, the quality of the received signal is as if there was point to point RF communication. The information contained within the original message is only demodulated at the terminating node. There is no digital processing done at an intermediate node (i.e. airborne nodes 108/118); therefore, the processing delay caused by same is greatly reduced or eliminated. Thus, the subcarrier modulation scheme described enables the "seamless" integration of wireless and optical channels with no additional coding or data processing.

Figure 4:
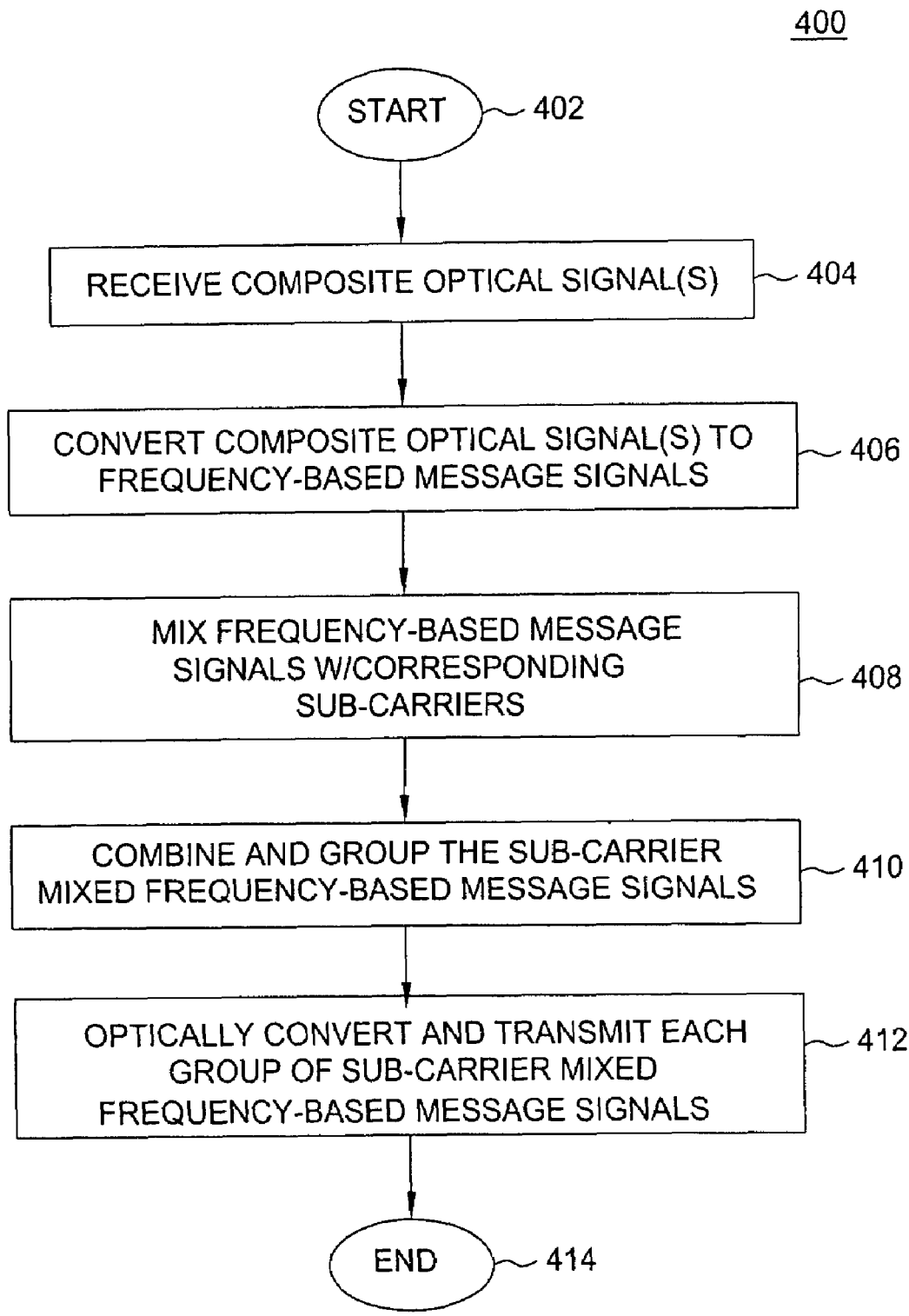
FIG. 4 depicts a series of method steps for routing messages with a hybrid optical/wireless network router in accordance with the subject invention.

FIG. 4 depicts a flowchart of a series of method steps 400 for routing messages in accordance with the subject invention. The earlier presented HOWRN 300 is a uniquely constructed component of the network 100. As such, the routing of messages therethorough follows unique series of steps as follows. The method starts at step 402 and proceeds to step 404 where one or more composite optical signals (i.e., signals found traveling along FSO links) are received by the router. At step 406, the composite optical signal(s) are converted to frequency-based message signals. In one embodiment, the composite signal(s) are split into a plurality of channels, converted to the frequency domain and filtered at predetermined sub-carrier frequencies to recover the baseband signal or original message.

At step 408, the frequency-based message signal(s) or baseband signals are each mixed with a corresponding new sub-carrier frequency. This new sub-carrier frequency is determined by information found in the control signaling area of the original message. In one embodiment, IP-based information (i.e., an additional MPLS label or header in the original message) is used to assign a particular sub-carrier frequency to each channel that will transmit a message to another node. Thus, each sub-carrier frequency represents a different wireless channel in the network that is available for message transfer. Mixing the frequency-based message signal to a sub-carrier signal is akin to affixing an IP address (or other similar type of destination information) to the message in order for it to reach its terminating point.

At step 410, the plurality of sub-carrier modulated (or mixed) frequency-based message signals are combined (i.e., frequency multiplexed) and grouped into new groups of sub-carrier modulated frequency-based message signals. The groups are, for example, the outgoing links to the next nodes in the network. The groups are established by, for example, passing all of the combined sub-carrier modulated frequency-based message signals through appropriate RF bandpass filters 310 as discussed above. At step 412, the groups of sub-carrier modulated frequency-based message signals are optically converted and transmitted (via the FSO links) to the next nodes. The method ends at step 414.

Although various embodiments that incorporate the teachings of the present invention have been shown and described in detail herein, those skilled in the art can readily devise many other varied embodiments that still incorporate these teachings.

What is claimed is:

1. An apparatus for routing messages in wireless networks, comprising:
    a first plurality of filters, each of said plurality of filters adapted to provide a plurality of frequency-based message signals converted from an optically-based signal;
    a plurality of mixers connected to the first plurality of filters, the mixers adapted to mix the plurality of frequency-based message signals with a plurality of sub-carriers to generate a plurality of frequency-based sub-carrier modulated message signals;
    a frequency generator connected to the plurality of mixers for providing the plurality of sub-carriers to the mixers;
    a combiner connected to the mixers for combining the plurality of frequency-based sub-carrier modulated message signals;
    a second plurality of filters connected to the combiner and adapted to receive and group the plurality of frequency-based sub-carrier modulated message signals;
    a plurality of optical transmitters, each of said plurality of transmitters connected to one of the second plurality of filters for optically converting and transmitting the frequency-based sub-carrier modulated message signals.

2. The apparatus of claim 1 wherein the each of the first plurality of filters is centered at a pre-defined subcarrier frequency.

3. The apparatus of claim 2 wherein the plurality of filters are RF filters.

4. The apparatus of claim 1 wherein the frequency generator generates and applies a particular sub-carrier frequency to one of the mixers according to control information associated with the frequency-based message signal.

5. The apparatus of claim 4 wherein the control information is associated with the frequency-based message signal via a generalized MPLS (GMPLS) label.

6. The apparatus of claim 4 wherein the control information is contained in a header portion of the frequency-based message signal.

7. The apparatus of claim 1 wherein the second plurality of filters are bandpass filters.

8. The apparatus of claim 1 further comprising a receiver device for receiving the optically converted and transmitted sub-carrier modulated message signals and filtering the sub-carrier frequencies from the frequency-based message signals.

9. Method for routing messages in wireless networks comprising the steps of:
    optically receiving one or more composite optical signals;
    converting said one or more composite optical signals into a plurality of frequency-based message signals;
    mixing each of the plurality of frecuency-based message signals with a corresponding sub-carrier to generate a plurality of sub-carrier modulated frequency-based signals;
    combining and grouping said plurality of sub-carrier modulated frequency-based signals; and
    optically converting and transmitting each group of said plurality of sub-carrier modulated frequency-based signals;
    wherein the step of mixing includes interpreting control information associated with the frequency-based message signal to determine the appropriate sub-carrier for mixing.

10. The method of claim 9 wherein the step of converting includes filtering the received signals at predetermined sub-carrier frequencies to recover the frequency-based message signals contained therein.

11. The method of claim 9 wherein the control information is contained within a generalized MPLS label of the frequency-based message signal.

12. The method of claim 9 wherein the control information is contained within a header of the frequency-based message signal and assigns a sub-carrier frequency thereto.

* * * * *